C. W. ALLAN.
PHOTOGRAPHIC ENLARGING APPARATUS.
APPLICATION FILED JUNE 15, 1917.

1,284,545.

Patented Nov. 12, 1918.
2 SHEETS—SHEET 1.

Inventor
C. W. Allan

By Milton E. Lowry
Attorney

C. W. ALLAN.
PHOTOGRAPHIC ENLARGING APPARATUS.
APPLICATION FILED JUNE 15, 1917.

1,284,545.

Patented Nov. 12, 1918.
2 SHEETS—SHEET 2.

Inventor
C. W. Allan
By Milton E. Lowry
Attorney

UNITED STATES PATENT OFFICE.

CHILTON W. ALLAN, OF TULSA, OKLAHOMA.

PHOTOGRAPHIC ENLARGING APPARATUS.

1,284,545.   Specification of Letters Patent.   Patented Nov. 12, 1918.

Application filed June 15, 1917. Serial No. 174,983.

*To all whom it may concern:*

Be it known that I, CHILTON W. ALLAN, a citizen of the United States, residing at Tulsa, in the county of Tulsa and State of Oklahoma, have invented certain new and useful Improvements in Photographic Enlarging Apparatus, of which the following is a specification.

The primary object of the present invention is to provide an enlarging apparatus for photographs, negatives and other pictorial sheets in the form of a box adapted for association with a folding roll-holding camera previously divested of its rear wall construction and film apparatus with means supported by the camera and box for holding a photograph or negative at a suitable distance from the camera lens and box.

A further object of the invention is to provide an enlarging apparatus for photograph negatives in the form of a box adapted to support a camera wherein one end of the box is constructed to receive sensitized paper or dry plates.

A further object of the invention is to provide an enlarging apparatus for photograph negatives wherein the frame for supporting the negatives is adjustably mounted to permit an enlargement of one portion only thereof or to be adjusted to permit an enlargement of equal dimensions.

With these general objects in view and others that will appear as the nature of the invention is better understood, the same consists in the novel construction, combination and arrangement of parts hereinafter fully described, illustrated in the accompanying drawing and pointed out in the appended claims.

In the drawing forming a part of this application and in which like numerals refer to corresponding parts throughout the several views.

Figure 1:
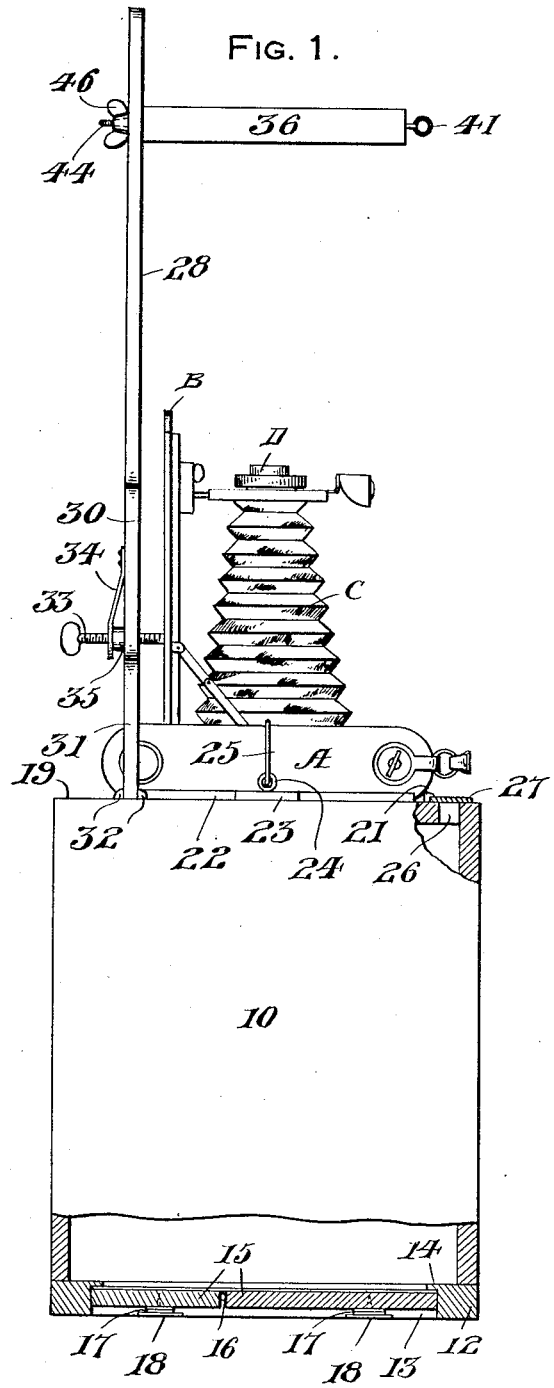
Figure 1 is a side elevational view of the device constructed in accordance with the present invention with a folding roll-holding camera in operative position thereon, the device being partially shown in cross section to illustrate novel parts thereof.
Figure 2:
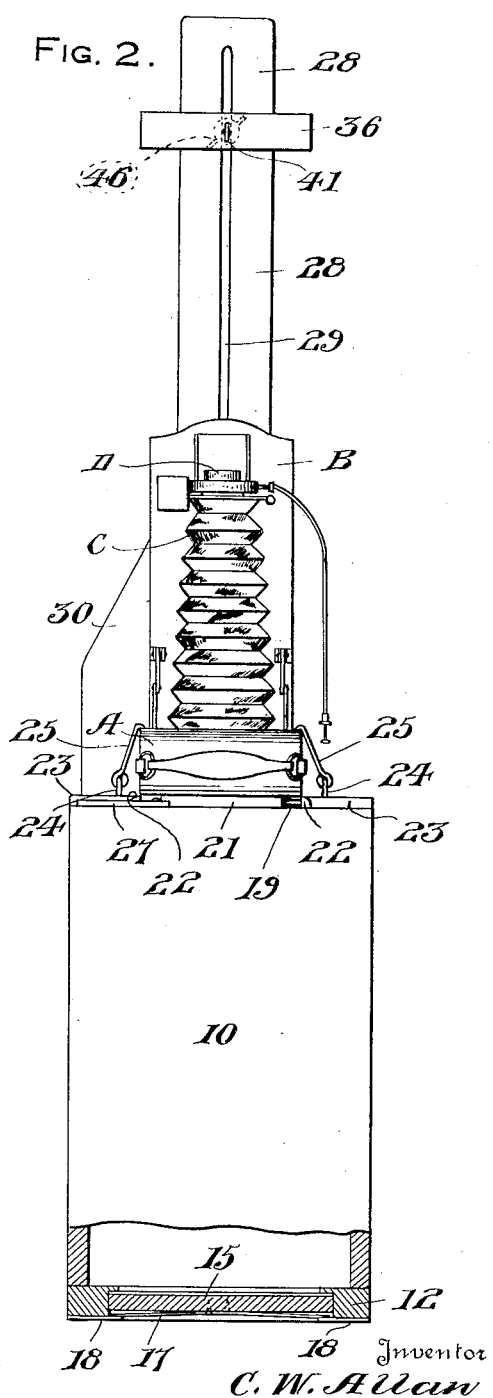
Fig. 2 is an end elevational view with the lower end thereof partially shown in section.
Figure 3:
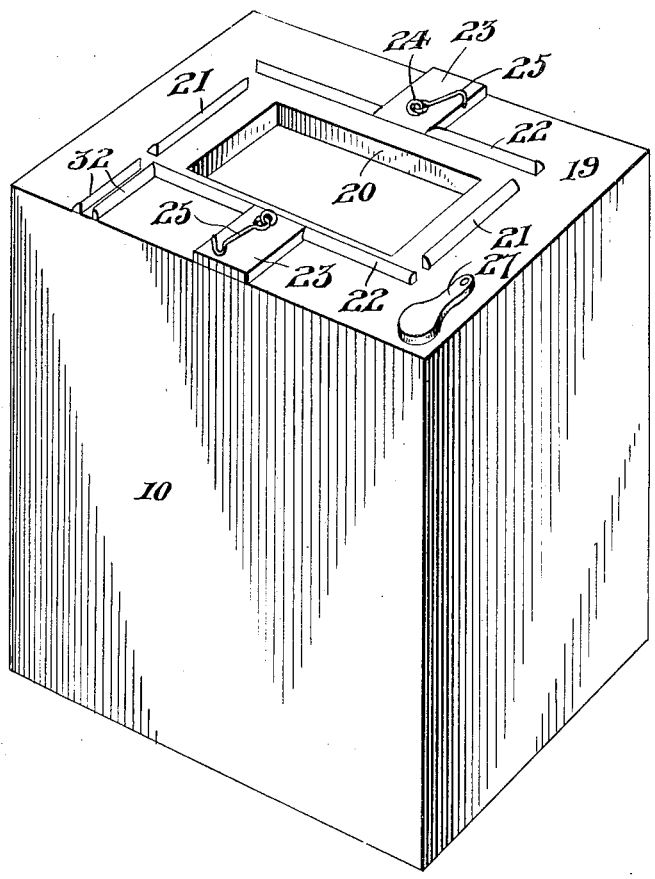
Fig. 3 is a detail perspective view of the enlarging box.

Briefly described, the present invention aims to provide an enlarging apparatus for photograph negatives in which there is provided a box preferably rectangular in construction, having an opening in one end thereof with adjacently positioned flanges or ribs to coöperate with the rear face of a folding camera previously divested of its removable rear wall, in a manner to exclude light from the interior of the box, it being noted that the box is painted interiorly with a dead black, *i. e.* lamp black, with means carried by the box holding the camera in position thereon. The bottom wall of the box is constructed to hold a sensitized sheet or photographic plate while the negative holding frame is jointly supported by the upper wall of the box and the camera, and during the operation of the device, the same is pointed or directed skyward as shown in Figs. 1 and 2.

Referring more in detail to the accompanying drawings, the reference numeral 10 designates the enlarging box of the present apparatus that is preferably of rectangular formation having the bottom wall 12 provided with a rectangular opening 13 defining an inwardly directed flange 14 upon which a sensitized sheet of photographic paper, or a photographic plate may be positioned and so retained by the closure plate 15 that is formed in two sections and hinged at 16, each of the sections 15 carrying a spring clamp arm 17 engaging beneath a clip 18 upon the bottom 12. This construction is clearly shown in Figs. 1 and 2. The sides and ends of the box 10 are imperforate while the upper wall 19 is constructed in a manner to coöperate with the open rear wall of a camera. The top wall 19 of the box is provided with a central rectangular opening 20 having two relatively short ribs or beads 21, each formed adjacent the ends of the opening 20 while side beads 22 are positioned slightly spaced from the sides of the said opening. A small block 23 is located at each side of the opening 20, spaced outwardly of the side beads 22 to have connected thereto eye-bolts 24 which hingedly support hooks 25 adapted for coöperation with the sides of a camera A to hold the same in position on the upper wall 19 of the box. A peep hole 26 is formed in one corner of the upper wall 19 of the box and is closed by a swinging blind or shield 27.

Any form of camera may be employed with this enlarging apparatus, but preferably as shown with a box embodying the specific details herein described, I have shown a folding roll-holding camera A being divested of its removable rear wall and having the outer sides thereof positioned between the side beads 22 with the spools within the camera that are free of film substantially frictionally engaging the end beads 21 in a manner to exclude light from the interior of the box 10. As shown in Figs. 1 and 2, the bellows platform B of the camera A is shown extended while the bellows C carrying the shutter controlled lens D is moved outwardly of the body of the camera A on the platform B.

Figure 4:
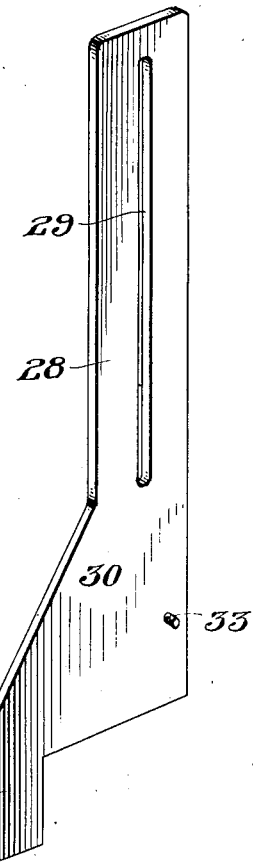
Fig. 4 is a detail perspective view of the negative plate-frame supporting arm.

The frame for supporting the negatives is shown in detail in Fig. 4 and includes an arm 28 provided with a longitudinal slot 29, the lower end of the arm 28 being offset as at 30 and further provided with a depending extension 31. In the operative positions shown in Figs. 1 and 2 the lower end of the arm 28 rests upon the upper wall of the camera A while the depending extension 31 is supported upon the upper wall 19 of the box 10 between the adjacent parallel flanges 32, the same being in a manner frictionally retained. Means is provided for positively positioning the arm 28 in a locked position upon the box and camera and includes a thumb screw 33 extending through the arm and engaged in the tripod socket in the outer face of the bellows platform B and so retained in an adjusted position by the spring finger 34 carried by the arm 28 and engaging the lock nut 35 upon the screw 33. If desired, the platform B may snugly engage the arm 28.

Figure 5:
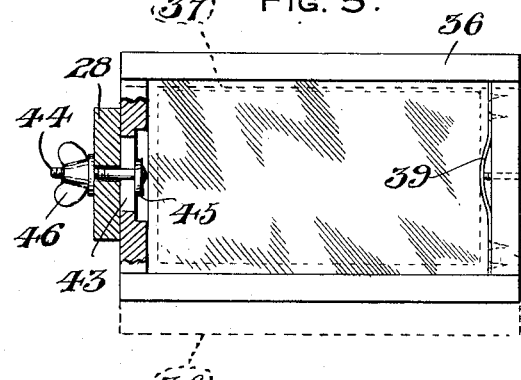
Fig. 5 is a plan view of the negative plate-frame, partially shown in section with the supporting arm therefor also shown in section, and, Fig. 6 is a detail perspective view of the negative holding plate-frame.
Figure 6:
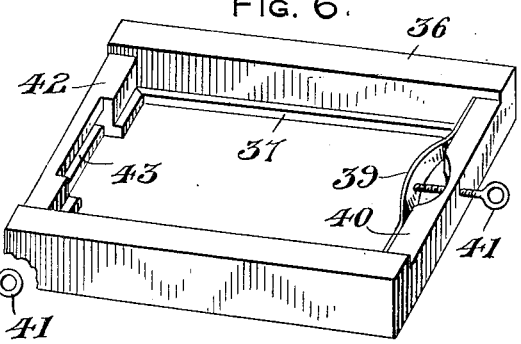

The negative holding frame 36 is slidably associated with the slot 29 in the arm 28, the negative holding frame 36 being preferably of rectangular construction as shown in Figs. 5 and 6 and having one side provided with a seating flange 37 upon which the photographic negative may be positioned as between a pair of clear glass plates or one clear plate and a ground glass plate, the photographic negative and supporting plates being held in position by the spring member 39 carried by the end wall 40 of the negative frame and engaged by the screw 41 projecting through the end wall to force the spring plate 39 into positive engagement with the negatives and plates contained within the holder. The opposite end 42 of the frame 36 is provided with a slot 43 through which projects the shank of a threaded bolt 44, the head 45 of the bolt being inwardly positioned of the slot and engaging the inner sides of the end wall 42 as shown in Fig. 5 while the threaded shank of the bolt 44 extends through the slot 29 in the arm 28 and receives upon the projected end thereof the thumb nut 46. By adjusting the thumb nut 46 the negative holding frame 36 may be shifted laterally of the arm 38 so as to position only a portion of the exposed negative contained therein to the lens of the camera A for purposes only of enlarging a selected portion of the negative.

The structural details of the invention having been described in detail, it is believed that the construction is at once apparent as well as the operation of the device being plainly obvious, it being noted that the size of the enlargement desired is controlled by the relative position of the negative carrying frame 36 with respect to the arm 28. When the negative carrying frame is at the extreme outer end of the slot 28 in the arm, the enlargement will be the greatest that may be obtained with this apparatus. In the particular use of the device, the parts are assembled as shown in Figs. 1 and 2 with a plain sheet of white paper positioned in the lower opening of the box 10 and retained by the clamping plates 15 which may directly engage the same or the ground glass plate. The device is taken out doors into the light and positioned to cause the lens D to be directed skyward, and the shutter or blind 27 removed from the peep hole. With a negative positioned in the frame 36, and projected through the lens D onto the paper in the lower end of the box, the same may be viewed through the peep hole 27 and the lens D may be accordingly adjusted in vertical directions to cause a sharp outline of the negative to appear upon the plain white paper. With a correct sharp outline of the negative upon the paper the shutter of the lens D is operated to exclude light from the box, the peep hole 26 covered by the blind 27 and the entire apparatus moved indoors into a comparatively dark room to substitute in the lower end of the box a sensitized sheet of photographic paper or photographic plate. When so arranged, the device is again moved out doors and a photograph taken in the usual manner. The sensitized paper or plate receiving the impression is then developed in any preferred manner and the desired number of prints can be made therefrom. By adjusting the negative frame 36 in the slot 29 the degree of enlargement may be readily controlled and also by shifting the frame 36 laterally by means of the bolt and slot connections 43 and 44 with the arm, an enlargement of a desired portion of a single negative may be produced.

It is to be understood that the term "negative" as used in the present specification and claims is specifically intended to only designate a plate or film through which light may pass and containing a developed photograph. Also, the term "negative holding frame" is intended to only include a frame particularly constructed to hold a negative in such manner as to allow light to pass through said negative whereby a proper copy or print from the negative may be obtained.

What I claim as new is:—

1. A negative or photograph enlarging apparatus including a box provided with an opening in its upper wall and adapted to have a folding roll-holding camera, divested of its removable rear wall, positioned over its said opening, means carried by said box coöperating with said camera to exclude light from the box, a slotted arm attached to the bellows platform of said camera resting at its lower end on said camera and having a laterally depending projection engaging the upper wall of said box, and a negative or photograph holding frame adjustably mounted in the slotted arm.

2. A negative or photograph enlarging apparatus including a box provided with an opening in its upper wall and adapted to have a folding roll-holding camera, divested of its removable rear wall, positioned over its said opening, means carried by said box coöperating with said camera to exclude light from the box, a slotted arm attached to the bellows platform of said camera resting at its lower end on said camera and having a laterally depending projection engaging the upper wall of said box, a negative or photograph holding frame adjustably mounted in the slotted arm, and means carried by said box adapted to engage said camera to secure the same in position on said box.

3. A negative or photograph enlarging apparatus including a box provided with an opening in its upper wall and adapted to have a folding roll-holding camera, divested of its removable rear wall, positioned over its said opening, means carried by said box coöperating with said camera to exclude light from the box, a slotted arm attached to the bellows platform of said camera resting at its lower ends on said camera and having a laterally depending projection engaging the upper wall of said box, a negative or photograph holding frame adjustably mounted in the slotted arm, and hooks carried by said box adapted to engage said camera to hold the same in position on said box.

In testimony whereof I affix my signature.

CHILTON W. ALLAN.